Nov. 28, 1967
D. A. CARIGNAN ETAL
3,354,938
APPARATUS FOR BLOCKING LENSES
Filed July 2, 1964
2 Sheets-Sheet 1
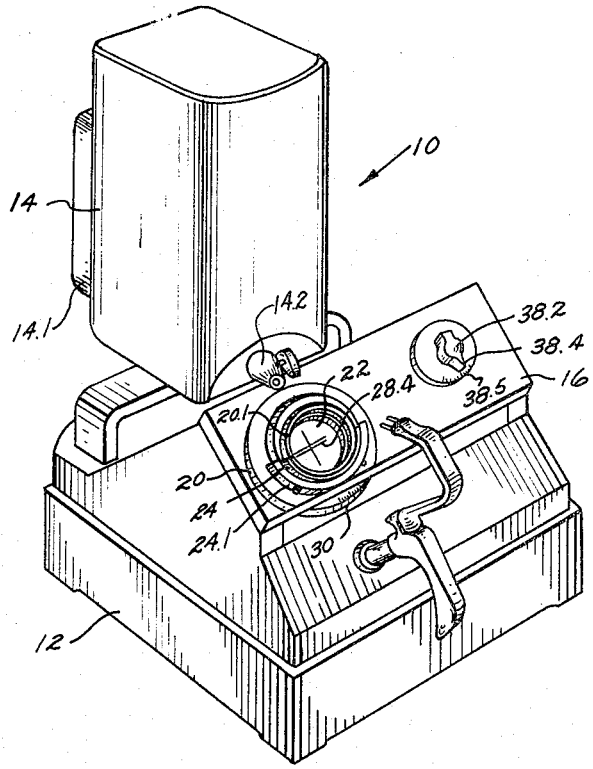
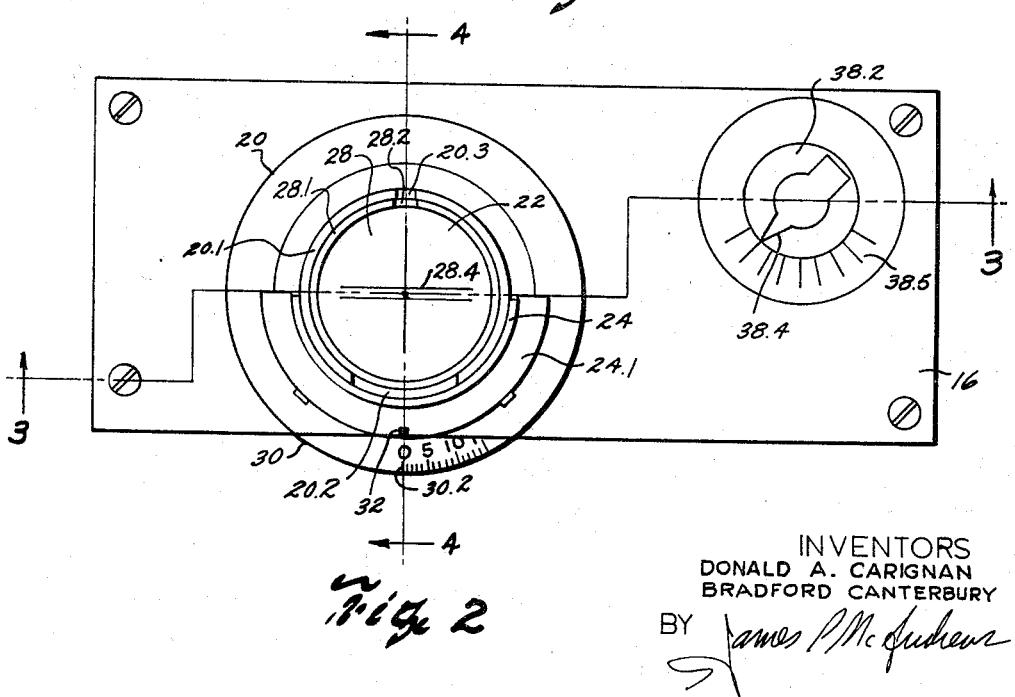
INVENTORS
DONALD A. CARIGNAN
BRADFORD CANTERBURY
BY *James P. McAndrews*
ATTORNEY

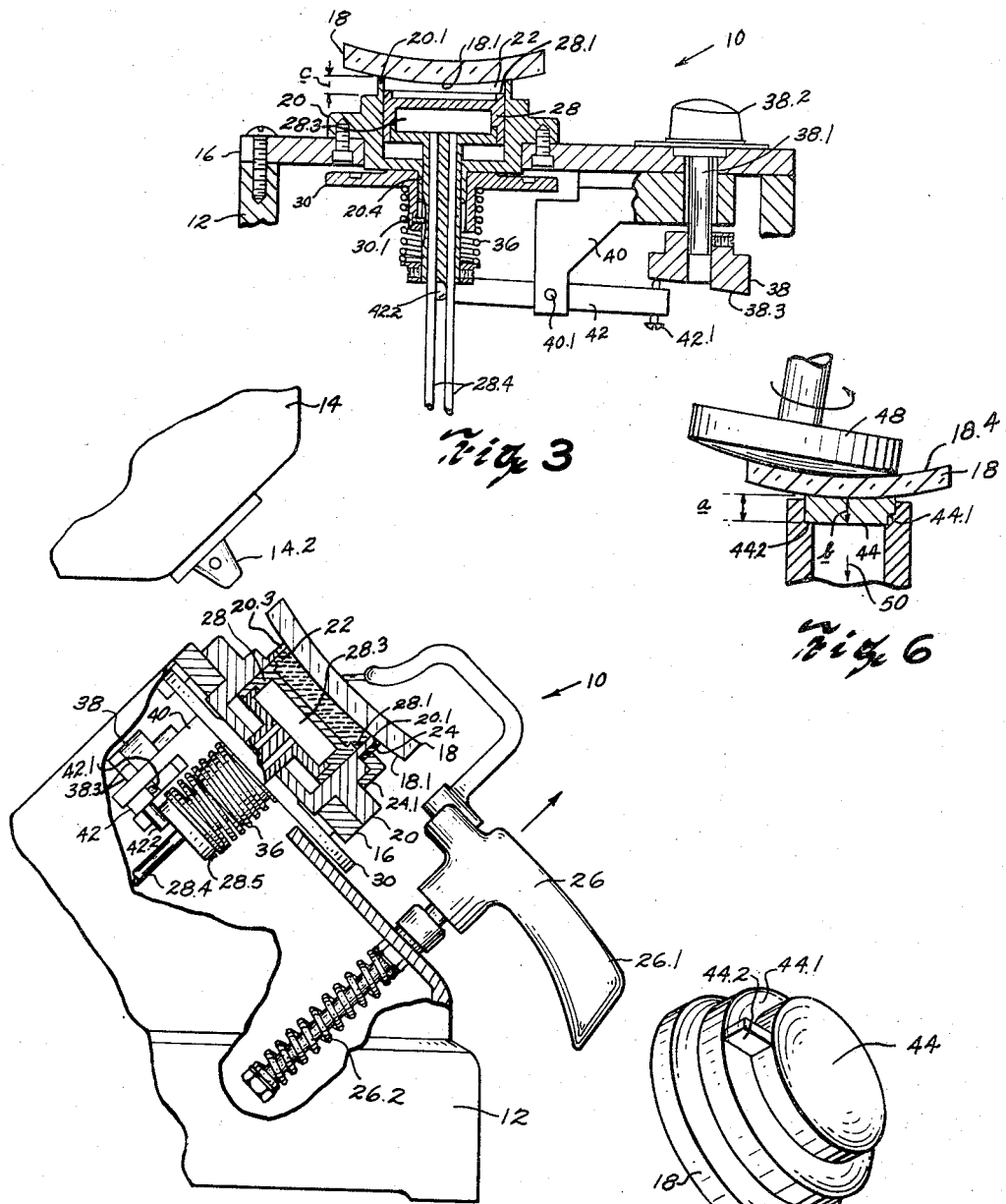

United States Patent Office 3,354,938
Patented Nov. 28, 1967

3,354,938
APPARATUS FOR BLOCKING LENSES
Donald A. Carignan and Bradford Canterbury, Southbridge, Mass., assignors to American Optical Company, Southbridge, Mass.
Filed July 2, 1964, Ser. No. 379,863
1 Claim. (Cl. 164—150)

The field of this invention is that of ophthalmic lens manufacture and the invention relates more particularly to novel and improved apparatus for temporarily mounting plastic lens blanks upon metal blocks so that the blanks can be supported by means of the blocks while the blanks are being processed into finished lenses.

In prior art lens blocking systems, a lens blank is placed over the open end of a mold cavity with one surface of the blank facing into the cavity. The cavity is then filled with a molten metallic alloy to mold a lens block in adherent relation to the lens blank surface. A convex lens blank surface placed on the mold in this manner will extend into the mold cavity to a particular degree depending upon the radius of curvature of the blank surface and, in one lens blocking system, the mold cavity is provided with sufficient depth so that any lens blank likely to be encountered can be accommodated on the mold without permitting the lens blank surface to touch the bottom of the mold. In an alternate blocking system, a piston is movably mounted in the bottom of the mold cavity, the piston having a pin or spacer portion adapted to contact the center of a lens blank surface placed on the mold for holding the piston at the same distance from the center of each lens blank surface regardless of the degree of curvature of the blank surface.

Where a mold cavity of fixed depth is used, lens blocks formed on lens blank surfaces which do not extend very far into the mold cavity are quite thick and have a substantial volume compared to lens blocks formed with the same mold means on lens blanks of small radius of curvature which can extend quite far into the mold cavity. These lens blocks of greater volume require a relatively long period of time for cooling of the metallic alloy before they can be removed from the mold cavity. Further, particularly, where plastic lens blanks are employed, the lens blocks of substantial volume tend to warp the lens blanks as the blocks are being molded on the blanks. On the other hand, lens blocks formed on those lens blank surfaces which extend quite far into the mold cavity tend to be too thin and provide inadequate support for the somewhat flexible plastic blanks when the blanks are being made into lenses. In the alternate prior art system, where the mold means has a piston portion adapted to contact the center of the lens blank surface for providing each lens block with the same center thickness, the single block thickness is optimum for only a single lens blank and tends to cause excessive warping or to provide inadequate support for lens blanks of other lens surface curvatures. Further, the piston contacts the most important central portion of the lens blank surface and leaves an aperture at this central location in a lens block molded upon the lens blank. This tends to cause an imperfection in the lens blank at the location of the block aperture, particularly in a plastic lens blank, as the blank is processed into a finished lens.

It is an object of this invention to provide novel and improved apparatus for blocking lenses. It is also an object of this invention to provide a novel and improved lens blocking apparatus which can mold lens blocks of a variety of thicknesses and volumes in adherent relation to lens blank surfaces; to provide such apparatus which can be easily regulated to form lens blocks of different thicknesses and volumes on lens blanks of respective different surface curvatures; to provide such an apparatus which can block lenses without causing imperfections in the lens blank surface; and to provide such apparatus which is of simple, inexpensive and rugged construction.

Briefly described, the apparatus provided by this invention includes a mold having an open-ended mold cavity and having a rim around the open cavity end upon which a lens blank can be disposed with a surface of the blank facing into the cavity. A piston is movably mounted within the cavity in spaced, facing relation to the lens blank surface and means are provided for moving the piston with respect to the lens blank surface as desired without permitting the piston to contact the lens blank surface. In a preferred construction, spring means bias the piston either toward or away from the lens blank surface and cam means can move the piston against the spring bias to permit variation or regulation of the piston position relative to the lens blank surface. The apparatus also includes means for introducing moldable material such as a melted metallic alloy into the mold cavity.

In accordance with this invention, a particular lens blank can be placed on the mold rim with a lens blank surface facing into the mold cavity. The piston can then be moved within the cavity for disposing the piston with optimum spacing from the lens blank surface, said spacing being selected with regard to the properties of the particular lens blank to form a lens block of sufficient thickness to provide adequate support for the blank at the same time minimizing lens blank warping and lens block cooling time. Moldable material such as a melted metallic alloy can then be introduced into the mold cavity for forming a lens block in adherent relation to the lens blank. The lens blank and the adherent lens block can then be removed from the mold. In a preferred arrangement, particularly where the apparatus of this invention is to be used for blocking lens blanks selected from a related series of lens blanks of different base surface curvatures, the cam means of the apparatus can be calibrated in terms of said base surface curvatures so that the piston can be conveniently positioned with the optimum spacing from the base surface for any lens blank of the series placed on the mold.

Other objects, advantages and details of the apparatus of this invention appear in the following detailed description of preferred embodiments of the invention, the description referring to the drawings in which:

FIG. 1 is a perspective view of the apparatus of this invention;

FIG. 2 is a plan view of the mold portion of the apparatus of FIG. 1 showing features of the mold cavity to enlarged scale;

FIG. 3 is a section view along line 3—3 of FIG. 2;

FIG. 4 is a section view along line 4—4 of FIG. 2;

FIG. 5 is a perspective view of a lens blank having a lens block formed thereon according to this invention; and FIG. 6 is a partial section view similar to FIG. 3 showing a blocked lens blank mounted in lens processing means.

Referring to the drawing, it can be seen that the apparatus 10 provided by this invention includes a base 12, a heating tank 14 from which a metallic alloy or the like of low melting temperature can be dispensed in a molten state, and a mold plate 16 upon which a lens blank 18 (see FIG. 3) can be disposed to be provided with a lens block. The heating tank 14 can comprise a simple container having heater means as indicated diagrammatically at 14.1 in FIG. 1 for melting a metallic alloy within the tank. The tank can also be provided with a valve means 14.2 for dispensing the alloy. The tank, heater means and valve means can be completely conventional and therefore are not described further herein.

The metallic alloy dispensed from the tank preferably comprises an alloy having a melting temperature on the order of 117° F. to 156° F. or the like.

As shown particularly in FIGS. 3 and 4, a mold member 20 can be bolted to the mold plate 16 to define an open-ended mold cavity 22, the mold having a rim 20.1 upon which the lens blank 18 can be rested with a lens blank surface 18.1 facing into the mold cavity. Preferably the mold rim is cut away as at 20.2 (see FIG. 2) and is replaced with a strip 24 of rubber or other flexible material held in place by clamp means 24.1 When this is done, a raised bifocal segment portion of a plastic lens blank can be accommodated on the part of the mold rim formed by the flexible strip 24 without tilting the blank. The mold rim is also cut away at 20.3 to provide an opening aligned with the dispensing valve 14.2 through which metallic alloy from the tank 14 can be introduced into the mold cavity 22. See FIG. 4. A spring clamp 26 including a handle 26.1 and a spring 26.2 serves to releasably hold the lens blank on the mold rim in conventional manner.

In accordance with this invention, a piston 28 defines the bottom of the mold cavity 22, the piston having a peripheral shoulder 28.1 which extends in a plane parallel to the mold rim 20.1 and having another surface or notch 28.2 which extends normal to the shoulder. The mold member 20 has a sleeve portion 20.4 (see FIG. 3) in which the piston 28 is mounted for movement toward and away from the lens blank 18 and for rotation relative to the lens blank. Preferably, the body of the piston is hollow as indicated at 28.3 and flexible tubes 28.4 communicate with a coolant source (not shown) so that water or other coolant can be circulated through the piston for cooling the mold cavity 22.

In order to control rotation of the piston 28 relative to the lens blank 18, the piston is preferably provided with a reference mark 28.4 which can extend horizontally when the piston is disposed in a normal position of rotation with respect to the lens blank. A dial 30 is keyed to the piston by screw means 30.1 as shown in FIG. 3, the dial extending out from beneath the mold plate 16 so that it can be conveniently manipulated. The dial is also provided with indicia 30.2 which are related to a reference mark or pointer 32 on the mold plate 16. As will be understood, the piston can be disposed in normal position within the mold member 20 when the zero point on the dial indicia is aligned with the reference mark 32 and can be arranged at any selected angle of rotation relative to said normal position when another appropriate dial indicia is aligned with the reference mark 32.

In order to control movement of the piston 28 toward or away from the lens blank 18, a flange 28.5 can be attached to the piston as shown in FIGS. 3 and 4. A helical coil spring 36 can then engage this flange to bias the piston for movement away from the lens blank. In addition, a face cam 38 mounted on a shaft 38.1 extending through the mold plate 16 can be rotated by a knob 38.2 located on top of the mold plate adjacent the open ended cavity 22. A bracket 40 attached beneath the mold plate 16 supports a lever 42 for pivotal movement around a pin 40.1, the lever having an adjustable cam follower 42.1 at one end engaging the face cam surface 38.2. At its opposite end, the lever has a pin 42.2 which engages the piston flange 28.5. In this construction, the face cam 38 can be rotated by means of the knob 38.2 for pivoting lever 42 and for moving the piston 28 toward the lens blank 18 against the bias of the spring 36 or can be rotated in the opposite direction for permitting the spring to move the piston away from the lens blank. The knob 38.2 can have a pointer portion 38.4 or the like and suitable indicia 38.5 can be marked on the mold plate 16 by means of which the position of the piston 28 in the mold cavity 22 can be indicated for different positions of rotation of the knob 38.2.

In blocking a lens blank with this apparatus, the piston 28 if first arranged with the reference mark 28.4 in a normal horizontal position. A lens blank 18 having a lens surface of selected base curvature 18.1 is then placed on the mold rim 20.1 with a selected meridian (not shown) of the blank aligned with the reference mark 28.4. If desired, the lens surface 18.1 can be provided with a protective or adhesive lens coating of any conventional type. The clamp 26 is then set for holding the blank in this position on the mold rim, and, if desired, the piston can be rotated by means of the dial 30 for orienting the mark 28.4 and the piston surface or notch 28.2 in a desired angular relation to said lens meridian. The knob 38.2 is then rotated for moving the lever 42 to establish a desired spacing between the piston and the lens blank surface 18.1 without contacting the blank surface. The valve means 14.2 then dispenses molten metallic alloy from the tank 14 through the mold rim aperture 20.3 for filling the mold cavity 22 as shown in FIG. 4. The metallic alloy is then cooled for forming a lens block 44 having the configuration of the mold cavity and for adhering the lens block to the lens blank surface 18.1. Thereafter the knob 38.2 can be further rotated for advancing the piston to eject the lens block and attach lens blank from within the mold cavity as shown in FIG. 5. Alternatively, any other conventional means could be employed for advancing the piston in the mold cavity 22 for ejecting the blocked lens blank from the cavity.

When a lens block 44 is formed on a lens blank 18 in this manner, the shoulder 28.1 and notch 28.2 of the piston form corresponding locating features 44.1 and 44.2 on the lens block. This blocked lens blank can then be mounted in a lens processing machine by reference to these locating features for permitting processing of the lens blank surface 18.4. For example, as shown diagrammatically in FIG. 6, the lens block 44 can be received within a vacuum chuck 46 in a conventional lens processing machine and can be located in the chuck relative to a lens processing tool 48 by reference to the block features 44.1 and 44.2. The block can be held on the chuck by a vacuum in conventional manner as is diagrammatically indicated by the arrow 50. In this way, the tool can process the lens blank surface 18.4 with the necessary orientation of that surface with respect to the lens surface 18.1 in well known manner.

It will be understood that when a quantity of molten metallic alloy is poured into the mold cavity 22 and subsequently cooled to form a lens block 44 in adherent relation to the lens blank 18 as shown in FIG. 4, the lens block tends to stress or warp the blank as the block material cools, particularly where the blank is formed of a plastic lens material such as allyl diglycol carbonate. In order to minimize this warping, it is desirable to locate the piston 28 very close to the lens blank surface 18.1 so that only a very small amount of the molten alloy must be poured into the mold cavity 22 and so that the dimensions $a$ and $b$ of the block 44 as shown in FIG. 6 are relatively small. It is also desirable to minimize the amount of metal alloy in the block 44 for economy of material and for permitting rapid cooling of the block in the mold cavity 22 as will be understood. On the other hand, when the lens block 44 and its attached blank 18 are mounted in the chuck 46, the lens blank tends to flex excessively in the direction of the arrow 50 under pressure of the lens processing tool 48 unless the block is thick enough to provide adequate support for the lens blank. This flexure of the blank is particularly apt to occur where the blank is formed of a plastic lens material.

In view of these competing considerations, it can be seen that a lens block 44 should be thick enough to provide adequate support for a lens but should not be too thick to cause excessive warping of the lens blank. In this regard it can also be seen that the edge and center thicknesses $a$ and $b$ of a lens block 44 which each play a part in both lens support and lens working, will vary in relation to each other depending upon the degree of curvature of the lens blank surface 18.1. That is, where the lens blank surface 18.1 has a substantial curvature, the surface will extend quite far into the mold cavity 22 when the blank surface is rested on the mold rim 20.1 and the block dimension $b$ will be quite small relative to the dimension $a$. As a result, it has been found that, particularly for plastic lenses, a different location of the piston 28 in the mold cavity 22 is required for each different lens blank in order to provide a lens block 44 which is appropriately sized to achieve a good balance between the competing considerations noted above. The actual spacing of the piston in the mold cavity is preferably empirically determined for each lens likely to be encountered. In this regard note that ophthalmic lens blanks are usually selected from a series which includes only a limited number of different blanks having different base surface curvatures 18.1. These blanks are then used to provide a wide variety of finished lenses in accordance with the lens surface 18.4 formed on the blank with the tool 48 or the like. Where such a series conveniently defines the range of lens blanks likely to be encountered, the indicia 38.5 in the present apparatus can be advantageously calibrated in terms of the base surface curvatures of the different lens blanks, whereby the piston 28 can be very conveniently located relative to the base surface 18.1 of any lens blank from the series to be blocked with the apparatus 10. For example, using one commercially available series of plastic lens blanks, the indicia 38.5 can be marked in terms of the nominal base surface curvatures 0.5, 2.5, 4.5, 6.5, 8.5, 10.5 and 12.5 diopters and the cam means 38.3 can be adapted to locate the piston at spacings $c$ (see FIG. 3) from the mold rim 20.1 of 1.59, 1.59, 2.08, 2.72, 3.56, 4.66 and 5.96 mm. respectively when the pointer 38.4 is aligned with said indicia. In this way the apparatus can form blocks 44 having a center thickness $b$ of 5.14, 4.16, 3.54, 2.98, 2.63, 2.50 and 2.50 mm. on respective lens blanks of the series.

It should be understood that although a particular embodiment of the method and apparatus of this invention has been described by way of illustration, this invention includes all modifications and equivalents thereof which fall within the scope of the appended claim.

We claim:

Apparatus for molding and attaching blocks to lens blanks selected from among a related series of blanks of different base surface curvatures, said apparatus comprising mold means having cavity with an annular open end upon which any one of said lens blanks of said series may be disposed with its base surface curvature facing into the cavity for closing the cavity, a piston defining the bottom of said cavity, said piston being movable longitudinally in said cavity to dispose said bottom at different desired settings of distance from said open end according to variations desired of the volume of said mold cavity between said bottom and the base surface curvature of any one blank of said series disposed upon said open end of said cavity, means for moving said piston, means only externally of said cavity for regulating said movement, said regulating means being calibrated for said settings in terms of said base surface curvatures of said lens blank series and means for introducing moldable material into said mold cavity to form a lens block of the desired volume adherently upon the base surface curvature of a lens blank closing said cavity.

References Cited

UNITED STATES PATENTS

| | | | |
|---|---|---|---|
| 1,727,889 | 9/1929 | McCabe | 51—277 |
| 2,459,205 | 1/1949 | Wells et al. | 18—34 |
| 3,049,766 | 8/1962 | Buckminster | 164—4 |
| 3,221,378 | 12/1965 | Faas et al. | 164—334 |

J. SPENCER OVERHOLSER, *Primary Examiner.*

V. K. RISING, *Assistant Examiner.*